United States Patent [19]
Zweighaft et al.

[11] Patent Number: 5,712,539
[45] Date of Patent: Jan. 27, 1998

[54] DIGITAL ACOUSTIC NOISE REDUCTION IN ELECTRIC MOTORS DRIVEN BY SWITCHING POWER AMPLIFIERS

[75] Inventors: James Zweighaft, Boulder; Mark H. Moyer, Arvada; Christopher Koerner, Longmont, all of Colo.

[73] Assignee: Exabyte Corporation, Boulder, Colo.

[21] Appl. No.: 483,521

[22] Filed: Jun. 7, 1995

[51] Int. Cl.$^6$ .................. H02P 6/00; H02P 7/01; B65H 59/38
[52] U.S. Cl. .................. 318/7; 318/254; 318/364
[58] Field of Search .................. 318/6, 7, 254, 318/138, 439, 699–832; 360/70–88; 242/334.4

[56] References Cited

U.S. PATENT DOCUMENTS

| | | | |
|---|---|---|---|
| 4,544,868 | 10/1985 | Murty | 318/254 |
| 4,743,815 | 5/1988 | Gee et al. | 318/254 |
| 4,763,049 | 8/1988 | Magee | 318/254 |
| 4,926,099 | 5/1990 | Ricker et al. | 318/254 |
| 4,943,760 | 7/1990 | Bryne et al. | 318/701 |
| 5,039,027 | 8/1991 | Yanagihara et al. | 318/7 |
| 5,051,680 | 9/1991 | Belanger | 318/701 |
| 5,119,000 | 6/1992 | Schultz | 318/254 |
| 5,227,704 | 7/1993 | Erdman | 318/254 |
| 5,264,775 | 11/1993 | Namuduri et al. | 318/811 |
| 5,350,988 | 9/1994 | Le | 318/618 |
| 5,376,866 | 12/1994 | Erdman | 318/254 |
| 5,382,886 | 1/1995 | Mizuide | 318/807 |
| 5,426,355 | 6/1995 | Zweighaft | 318/364 |
| 5,465,918 | 11/1995 | Watanabe | 242/334.2 |
| 5,491,391 | 2/1996 | Bahr et al. | 318/39 |
| 5,497,064 | 3/1996 | Van Sistine | 318/701 |
| 5,525,887 | 6/1996 | Van Sistine | 318/701 |
| 5,541,484 | 7/1996 | DiTucci | 318/254 |
| 5,543,700 | 8/1996 | Sakano et al. | 318/701 |

*Primary Examiner*—Paul Ip
*Attorney, Agent, or Firm*—Nixon & Vanderhye, P.C.

[57] ABSTRACT

A system and method is provided for controlling a brushless DC motor (100), the motor being of the type having a plurality of coils (25, 26, 27) and a switching amplifier coil driving circuit (25A, 26A, 27A) including a plurality of transistors (21, 22, 29, 30, 33, 34). Current application to the plurality of transistors is controlled to obtain, near a commutation point of the motor, a simultaneous rise in current applied to a first of the transistors and a fall in current applied to a second of the transistors. Controlling application of current to the plurality of transistors involves, for each of the transistors, generating a PWM gate drive signal by selectively switching between a nominal PWM signal and a constant signal. The selective switching is in response to a synthesized state signal, the synthesized state signal being generated to alternate variably between the two states in accordance with a desired ramping of current to the first and second transistors. In one embodiment, the control system is employed for a motor used to rotate a reel of a helical scan tape drive.

33 Claims, 10 Drawing Sheets

DIGITAL ACOUSTIC NOISE REDUCTION IN ELECTRIC MOTORS DRIVEN BY SWITCHING POWER AMPLIFIERS

BACKGROUND

1. Field of Invention

This invention pertains to operation of electric motors driven by switching power amplifiers, and in particular to noise reduction for such motors.

2. Related Art and Other Considerations

Axial gap brushless-DC motors typically comprise a magnetic disk axially separated from a set of electrically driven coils. The magnetic disk essentially lies in a plane and is connected to or otherwise forms a rotor or the like of the motor. The rotor turns as electrical signals are applied to the coils in order to influence rotation of the magnetic disk about its central axis. In particular, in order to keep the motor turning, the motors' coils must be energized or de-energized when the magnetic disk is at fixed angular positions (called commutation points) about its axis. When this occurs, one set of coils is turned on, and another set is turned off, resulting in a new set of force vectors acting on the magnetic disk.

The new force vectors act primarily to pull or push the rotor of the motor in the desired angular direction in the plane of the disk. However, the new force vectors also cause a small amount of "out of plane" movement. While the motor bearings are designed to constrain such undesirable motion, a small amount nevertheless does occur. The "out of plane" movement causes an audible noise that increases in frequency and volume with motor speed. Noise also occurs to a lesser extent in other types of electric motors, but their mechanical designs are typically less sensitive to this effect.

Axial gap brushless-DC motors produce significant acoustic noise under high speed, high load conditions. This occurs (as explained above) because the motor torque acts not only to rotate the magnet disk, but also to tilt it in an undesired direction.

All electric motors require specialized drive circuitry, of which can be divided into two broad classes, "linear" and "switching" power amplifiers. A linear power amplifier applies an essentially continuous voltage to each motor coil as long as the motor is between two commutation points. This range of motion is called the commutation interval or angle. The resulting motor current is a function of this applied voltage, coil resistance and back-emf.

In contrast, a switching power amplifier applies one of only two voltages (V− and V+), rapidly switching between the two many times during each commutation angle. The current in each motor coil responds relatively slowly to the applied voltage such that it is the percentage of time that V+ is applied (the "duty cycle") which determines the average current level in the motor. In some cases the switching frequency is high enough so that the resulting motions are beyond the range of hearing. But, unfortunately, the commutation frequency normally cannot be selected to be in a particularly desired range for avoiding acoustic noise, since the frequency of commutation depends on the motor speed and the number of commutation points per revolution. As a result, acoustic noise is prone to develop in some applications, such as for reel motors utilized in magnetic tape drives, for example.

If a motor is driven by a linear control circuit, commutation noise can be reduced by the use of snubber circuits. Snubber circuits slow the rise and fall of current in each motor coil at the commutation points. While this decreases efficiency, it also reduces acoustic noise because the transition from one coil set to another occurs more gradually.

Those skilled in the art will appreciate that the use of snubbers in a switching power supply is limited by the switching speed required, which in turn depends on the inductance of the motor, the maximum voltage and other factors. This limitation precludes the use of a snubber with a time constant long enough to have a significant effect on acoustic noise. Hence, another technique is required to address acoustic noise in an electric motor when it is driven by a switching type power supply.

SUMMARY

A system and method is provided for controlling a brushless DC motor, the motor being of the type having a plurality of coils and a switching amplifier coil driving circuit including a plurality of transistors. Current application to the plurality of transistors is controlled to obtain, at a commutation point of the motor, a simultaneous rise in current applied to a first set of the transistors and a fall in current applied to a second set of the transistors. Controlling application of current to the plurality of transistors involves, for each of the transistors, generating a PWM gate drive signal by selectively switching between a nominal PWM signal and a constant signal. These sets of transistors may, and typically do, partially overlap. The selective switching is in response to a synthesized state signal, the synthesized state signal being generated to alternate variably between the two states in accordance with a desired ramping of current to the first and second sets transistors. In one embodiment, the control system is employed for a motor used to rotate a reel of a helical scan tape drive.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
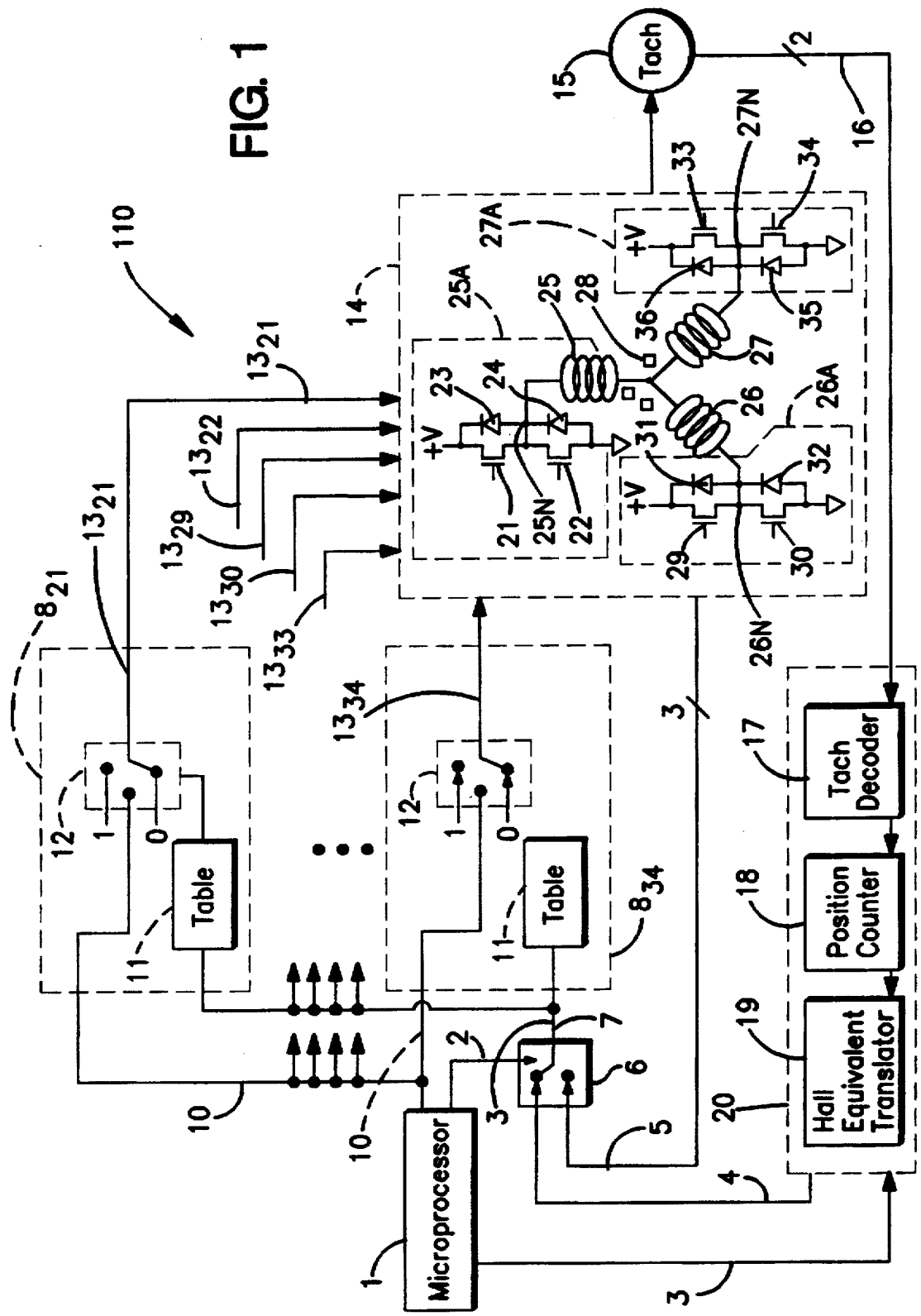
FIG. 1 is a schematic view of a brushless DC motor control system according to an embodiment of the invention.
Figure 2:
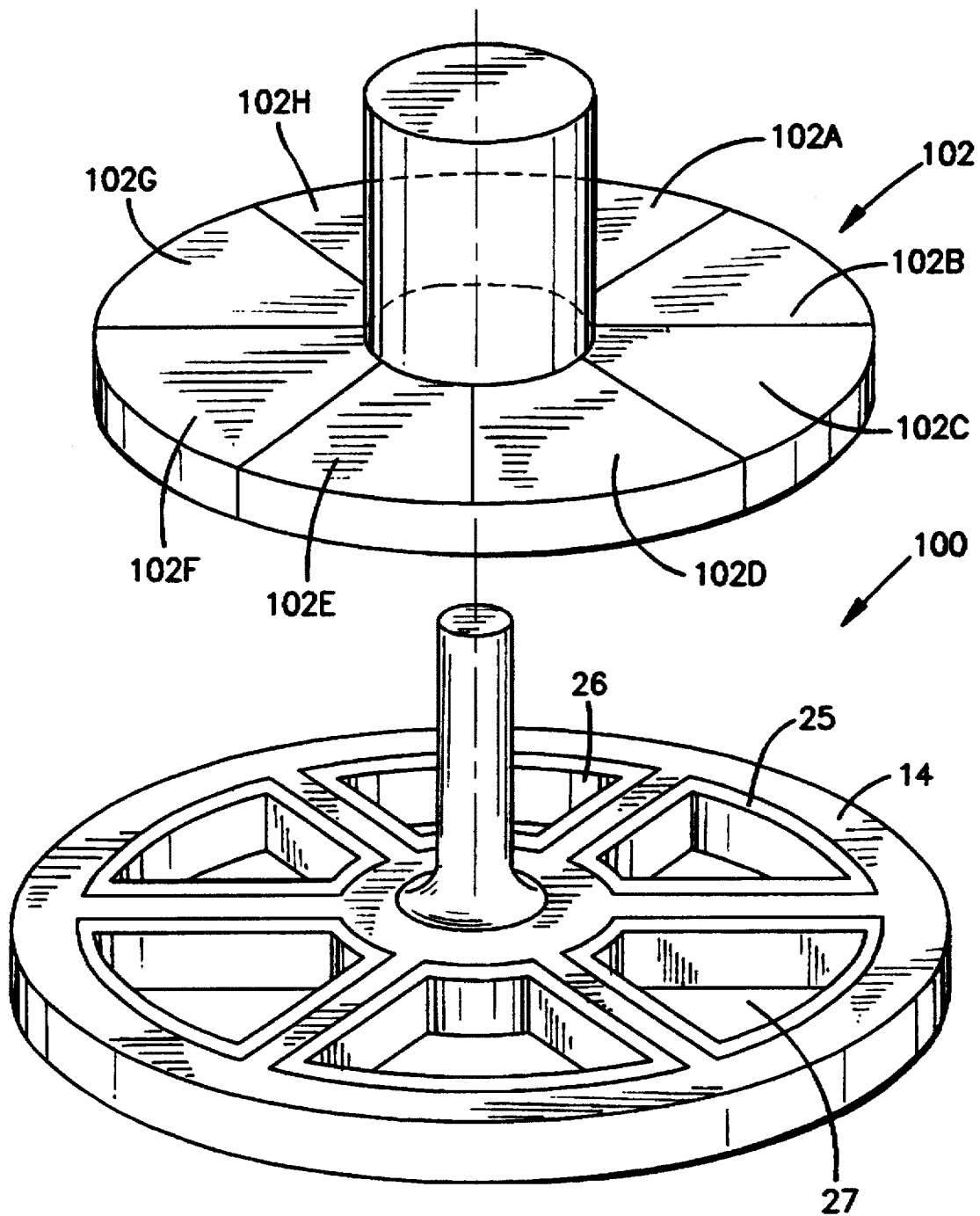
FIG. 2 is an exploded side isometric view of axial alignment of a coil-based portion and a magnetic rotor of the brushless motor control system of FIG. 1.

FIG. 1 illustrates a brushless DC motor control system 110 which controls brushless DC motor 100. Brushless DC motor 100 which is controlled by control system 110 is collectively illustrated in FIG. 1 and FIG. 2. FIG. 1 shows a coil-based portion 14 of brushless DC motor 100. FIG. 2 shows an axial alignment of coil-based portion 14 with a magnetic rotor 102. FIG. 2 further shows magnetic rotor 102, particularly illustrating rotor 102 as a flat disk having eight equal pie shaped sections 102A–102H, with each section comprising a north-south magnet.

Coil-based portion 14 of motor 100 includes three stationary coils spaced 120 mechanical degrees apart, particularly coil 25, coil 26, and coil 27. First ends of each of coils 25, 26, and 27 are connected together as shown in FIG. 1.

Each coil 25, 26, and 27 has a coil driving circuit. Coil 25 has coil driving circuit 25A, coil 26 has coil driving circuit 26A, and coil 27 has coil driving circuit 27A. Each coil driving circuit has a coil interface node which is connected to a second end of the coil which it drives. In each coil driving circuit an "upper" transistor (FET) and an "upper" flyback diode are connected in parallel between +V and the coil interface node; a "lower" transistor and a "lower" flyback diode are connected in parallel between the coil interface node and ground.

As an example of the foregoing, coil driving circuit 25A has a coil interface node 25N connected to the second end of coil 25. Upper transistor 21 and upper flyback diode 23 are connected in parallel between +V and coil interface node 25N; lower transistor 22 and lower flyback diode 24 are connected in parallel between coil interface node 25N and ground. Similarly, with respect to coil driving circuit 26A, upper transistor 29 and upper flyback diode 31 are connected in parallel between +V and coil interface node 26N; lower transistor 30 and lower flyback diode 32 are connected in parallel between coil interface node 26N and ground. Likewise, with respect to coil driving circuit 27A, upper transistor 33 and upper flyback diode 36 are connected in parallel between +V and coil interface node 27N; lower transistor 34 and lower flyback diode 35 are connected in parallel between coil interface node 27N and ground.

In addition to the coils and coil driving circuit, coil-based portion 14 of motor 100 has three Hall Effect sensors 28 which sense the angular position of magnetic rotor 102. In conventional manner, Hall Effect sensors generate on Hall line 5 a three-bit signal indicative of angular position of magnetic rotor 102. Although Hall line 5 in FIG. 1 is shown generally as being connected only to coil-based portion 14 of motor 100, it should be understood that Hall line 5 is appropriately connected to the three Hall Effect sensors 28.

Motor control system 110 which controls motor 100 includes processor 1; state machine 20 (also known as the state signal generator); mode switch 6; motor tachometer 15; and, a plurality of Commutation Look-Up Table and PWM (Pulse Width Modulation) Control circuits collectively referred to as machine 8. A Commutation Look-Up-Table and PWM Control circuit is provided for each of the transistors in coil driving circuit 110, specifically transistor control circuits $8_{21}, 8_{22}, 8_{29}, 8_{30}, 8_{33},$ and $8_{34}$, each transistor control circuit 8 being subscripted with a corresponding number for a respective one of the transistors 21, 22, 29, 30, 33, and 34 with which it is associated.

Processor 1, which can be a microprocessor, for example, has mode select output line 2 connected to a mode select control terminal of mode switch 6 and PWM output line 10 connected to each transistor control circuit $8_{21}, 8_{22}, 8_{29}, 8_{30}, 8_{33},$ and $8_{34}$, in machine 8. The PWM signal carried on line 10 is known herein as a processor PWM signal or a nominal PWM signal.

Mode switch 6 is, in the illustrated embodiment, a multiplexer having a first set of input terminals connected to Hall Effect sensors 28 via Hall line 5 and a second set of input terminals connected to state machine 20 via line 4. Mode switch 6 has a mode select output line 7 connected to each transistor control circuit $8_{21}, 8_{22}, 8_{29}, 8_{30}, 8_{33},$ and $8_{34}$, in machine 8 as hereinafter discussed. It should be understood that mode switch 6 can take forms other than a multiplexer in other embodiments.

State machine 20, as shown in FIG. 1, comprises a serial connection of tach decoder 17; position counter 18; and Hall translation device 19. In the preferred embodiment, state machine 20 is an integrated circuit.

Tachometer 15 outputs a two-bit signal on tachometer output line 16 to state machine 20. Tach decoder 17 receives the tachometer output signal on tachometer output line 16; Hall translation device 19 generates a noise reduction input signal applied on line 4 to mode switch 6.

As indicated earlier, Commutation Look-Up Table and PWM Control Machine 8 comprises six sets of circuits $8_{21}, 8_{22}, 8_{29}, 8_{30}, 8_{33},$ and $8_{34}$, one circuit for each of the six transistors 21, 22, 29, 30, 33, and 34 of motor 100. Although FIG. 1 illustrates the specifics of only circuits $8_{21}$ and $8_{34}$ for machine 8, it should be understood that six such circuits are actually provided, each transistor control circuit $8_{21}, 8_{22}, 8_{29}, 8_{30}, 8_{33},$ and $8_{34}$ being connected to receive PWM output line 10. Accordingly, machine 8 outputs six PWM output signals, i.e., outputs signals on each of gate feeding lines $13_{21}, 13_{22}, 13_{29}, 13_{30}, 13_{33},$ and $13_{34}$, to gates of respective transistors 21, 22, 29, 30, 33, and 34 of motor 100.

Each of the six circuits comprising machine 8 includes a commutation table 11 and signal source select switch 12. In the illustrated embodiment, commutation table 11 is unique for each circuit in machine 8. In essence, commutation table 11 is a look-up table which, for the particular one of the motor transistors with which it is associated, uniquely determines a state of a select control signal to signal source select switch 12 based on the mode select output signal on line 7 from mode switch 6. It should be understood, however, that another embodiment, information for the six commutation tables 11 can be combined into a single commutation table which is indexed so as to be referenced appropriately for each transistor.

In the illustrated embodiment, signal source select switch 12 is a multiplexer having a control terminal connected to receive its select control signal from its associated commutation table 11. For other embodiments, structure other than a mulitplexer can be employed so long as a similar function is accomplished.

Signal source select switch 12 has three sets of input terminals—a "1" input terminal; a PWM input terminal which is connected to line 10 to receive the PWM signal output by processor 1; and a "0" input terminal. Signal source select switch 12 connects its output line 13 to one of these three terminals, the connection being in accordance with the state of its select control signal from its associated commutation table 11. Thus, signal source select switch 12 can select either the PWM signal on line 10, or 0 or 1 to be applied on line 13 to the gate of its associated transistor. For purposes of this discussion, a "0" turns the transistor off (meaning no current can flow in it), while a "1" turns it on. The "PWM" signal is simply a rapid (compared to the commutation frequency) switching between 1 and 0.

OPERATION

As used herein, a "commutation state" refers to which transistors are on (for the duration of the commutation state), which transistors are off, and which transistors are being switched rapidly (using the PWM signal on line 10). This in turn defines which coils 25, 26, an 27 have current flowing therethrough and the polarity of that current. In the illustrated embodiment, there are six commutation states for every ninety degrees of rotation of rotor 102. In each state, current is flowing in only two of the three coils. Commutation states are associated with a particular three bit value of Hall sensors 28. The transition from one commutation state to another is called a "commutation point", and is associated with a particular angular position of rotor 102.

Between ramps of a given commutation cycle, four of the six transistors 21, 22, 29, 30, 33 and 34 will be off ("0" applied to their gate inputs) at any given time, while another transistor will be on ("1" applied to it's gate), and the last transistor will rapidly switch on and off (having a gate drive PWM signal applied on its respective line 13 to it's gate). The switching frequency of the PWM signal is understood to be much faster than the commutation frequency. As motor 100 rotates, different transistors will be turned on and off, although there will always be four transistors off, one transistor on, and one transistor will be switching (PWM'd).

Two modes of operation are discussed herein—a "normal" mode and a "noise reduction" mode. As explained in more detail below, a difference between these modes is a technique for controlling the switching of transistors being switched, and particularly for controlling the timing (i.e., inception and termination) of the switching and the duty cycle PWM signal applied to the switched transistors. As used herein, "duty cycle" is the ratio of how long a PWM signal is "1" divided by the PWM cycle time ("1" plus "0" time).

In the first mode or "normal" mode, acoustic noise reduction techniques are not implemented. In the normal mode, processor 1 applies on line 2 a signal which causes mode select switch 6 to apply consistently the Hall output values on line 5 to machine 8. Thus, in the normal or non-noise reduction mode of operation, the signal on line 7 is selected to come from the Hall sensors 28. Hall sensors 28 encode the angular position of rotor 102 to a resolution of 24 parts per revolution (15 degrees) in the preferred embodiment. In the normal mode, state machine 20 and synthesized Hall signals on line 3 are not used. As rotor 102 rotates, the values of the Hall sensor signals on Hall line 5 change, and this in turn controls which signals are applied to the transistors (21, 22, 29, 30, 33 and 34) through the action of table 11 and switch 12.

Figure 3:
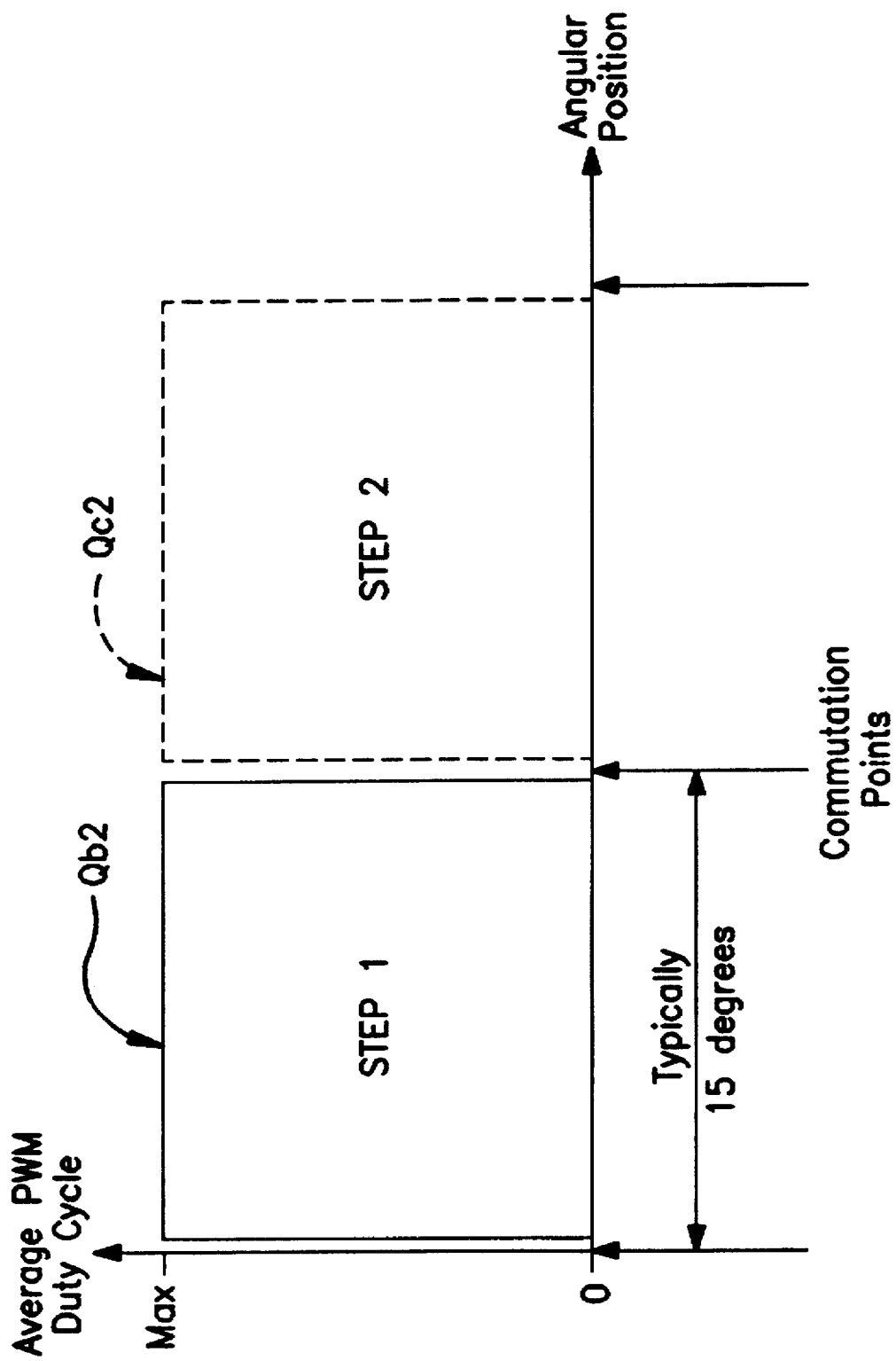
FIG. 3 is a graph showing two consecutive steps of a normal operation commutation sequence.

FIG. 3 shows the normal mode of operation. At the commutation points, one coil is turned off abruptly as another is turned on. As indicated previously, this sudden change can result in acoustic noise, especially in "axial gap" type motors. In the illustrated example of a three phase, eight pole brushless dc motor, commutation takes place every 15 degrees of motor rotation. The illustrated embodiment shows the transistor switching sequence of a "two quadrant" power amplifier. In this embodiment, the current in the motor is approximately proportional to the duty cycle. The voltage applied to one of the motor coils is either zero (when the PWM signal is zero) or "+V" (when the PWM signal is 1). In the preferred embodiment, "+V" is twelve volts.

In the noise reduction mode, discussed in more detail below, processor 1 selects (by changing the state of mode select line 2) the state signal on line 4 to be applied via switch 6 to machine 8. The state signal on line 4 is derived by state machine 20 using position tachometer information on line 16. The angular resolution of the tach signal on line 16 must be much greater than that of the Hall sensors 28. In the preferred embodiment, there are 2880 distinct angular positions per motor revolution resolved by tachometer 15 compared to only 24 resolved by Hall sensors 28.

Thus, reviewing the two modes of operation, the position of the switches 12 in each of the circuits comprising machine 8 depends on how its associated commutation table 11 responds to the value of the signal on line 7. In accordance with the value of the mode select signal applied on line 2 from processor 1 to mode select switch 6, the value on line 7 may come either from the magnetic Hall position sensors 28 in motor 100 (in the normal mode) or be a state value applied on line 4 from state machine 20 (in the noise reduction mode). In essence, the state value applied on line 4 is a "synthesized" signal which is derived from the tach sensor 15 via machine 20.

Figure 4:
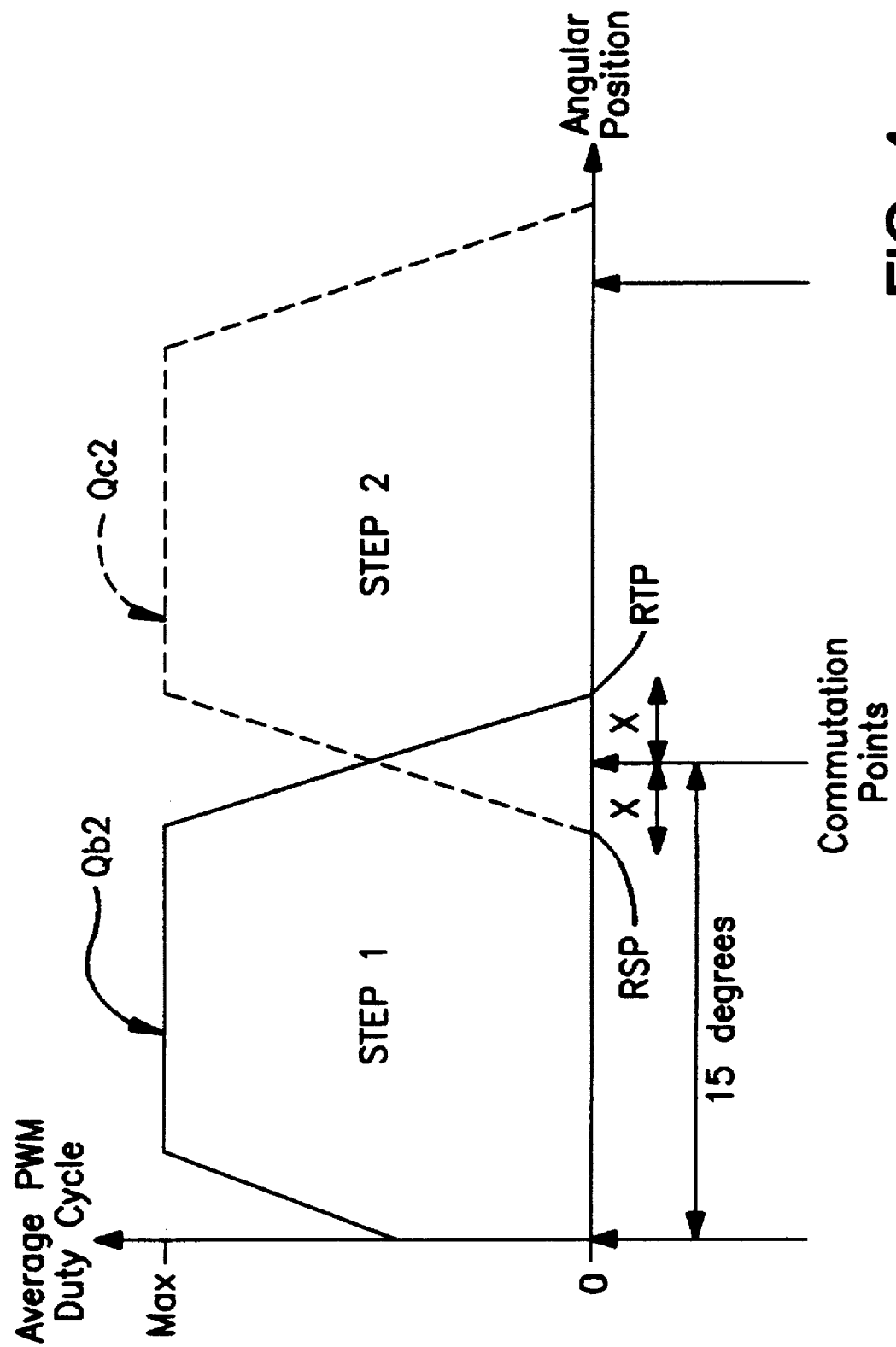
FIG. 4 is a graph showing two consecutive steps of a noise reduction commutation sequence in accordance with the invention.

Turning now in more detail to the noise reduction mode of operation, attention is directed to FIG. 4 as graphically showing two consecutive steps of a noise reduction commutation sequence. FIG. 4 shows how control system 110 of the invention controls the average duty cycle applied (on an appropriate one of lines 13) to each coil. Before motor 100 rotates to the normal commutation point, the transistor gate PWM signal applied on line $13_{30}$ to transistor 30 (transistor Qb2) is switched between "0" and the PWM signal on line 10. Such switching is effected by signal source select switch 12, in response to its select control signal as output from its associated table 11, which in turn is based on the value of synthesized Hall signal on line 4 as applied on line 7 via switch 6.

Since the processor or nominal PWM signal on line 10 is also changing between 0 and 1, it is important that the switching action of signal source select switch 12 be slower than that of the processor PWM signal on line 10. The resulting gate drive signal on line 13 will therefore consist of at least one on/off pwm cycle, followed by some time at 0. The motor current is reduced to the extent that the gate drive signal on line 13 spends more time at 0 than at 1. This results in a reduced average duty cycle being applied on line 13, and consequently a reduced average current in that coil.

The processor PWM signal on line 10 can have any duty cycle from 0 to 100%, but is chosen to be constant in the illustrated embodiment. However, due to the action of signal source select switch 12, the average duty cycle of the gate drive signal on line 13 is changing.

FIG. 4 shows that the gate drive PWM signal output on line 13 spends some time at a maximum duty cycle. This maximum can be anything between 0 and 100%, and the time spent at the maximum can as short as desired in order to tune the system to the characteristics of motor 100.

As motor 100 rotates closer to a commutation point, the gate drive signal on line 13 spends increasingly more time connected to a zero than it does connected to the processor or nominal PWM signal on line 10 (which is itself rapidly switching between zero and one). The current in coil 26 is therefore ramped down. At the same time, the current in coil 27 is ramped up by a similar action. The result is an overlap of current flow in coils 26 and 27 which greatly reduces acoustic noise. By contrast, in the prior art, there is no overlap and one coil is always off.

Figure 5:
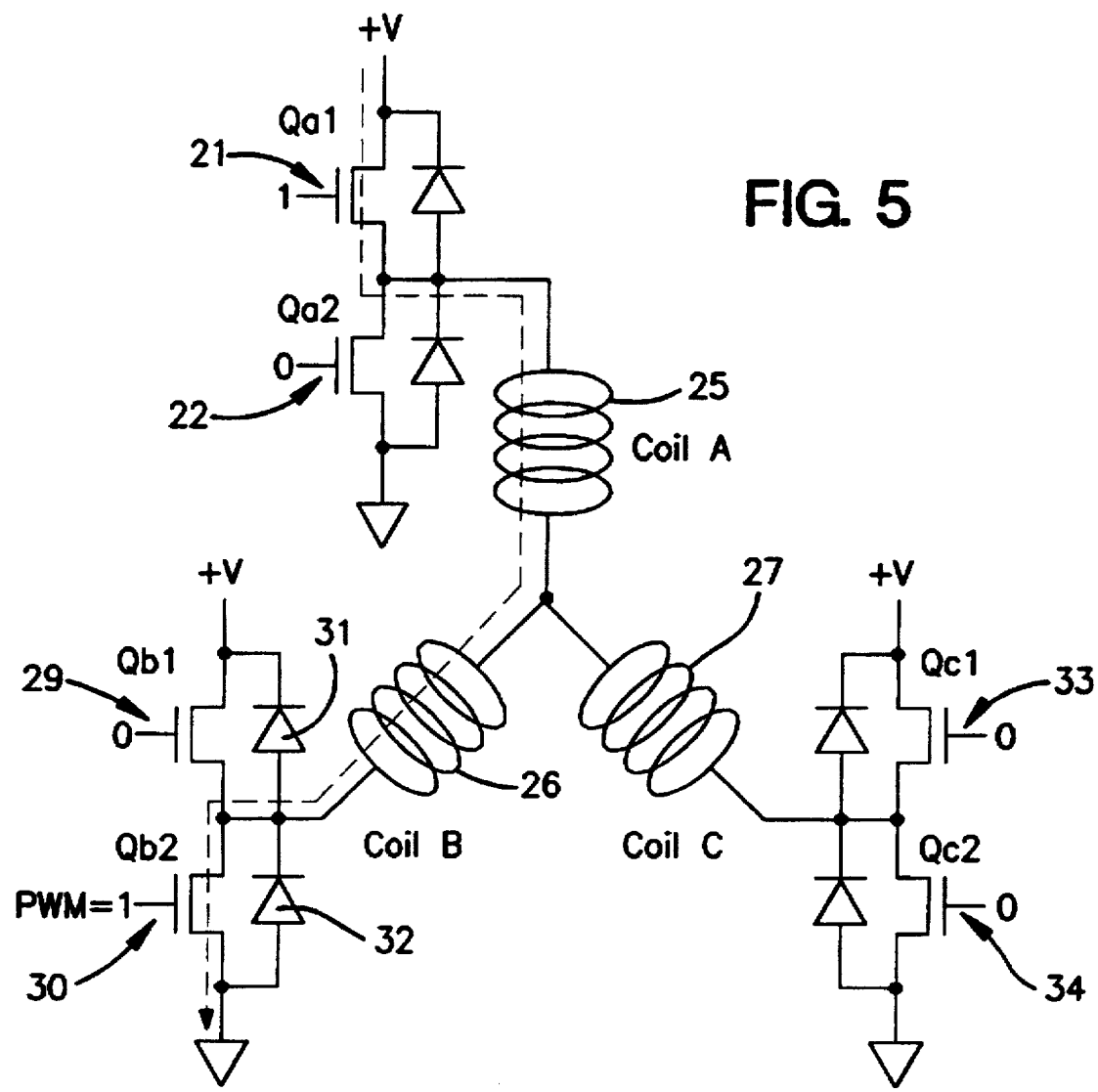
FIGS. 5–8 are schematic views showing current flows through coils and transistors of the motor governed by the motor control system of the invention.
Figure 6:
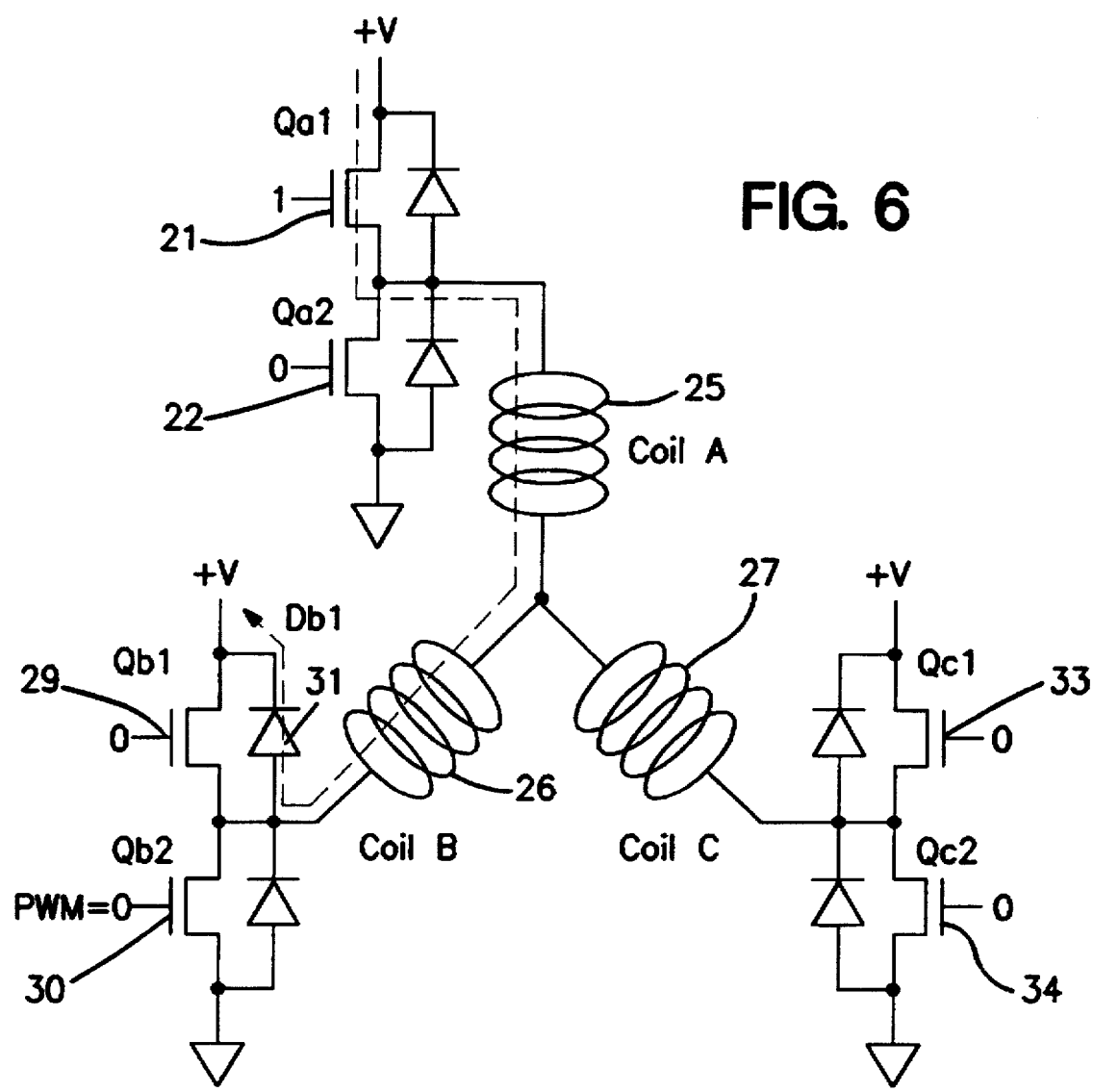

FIGS. 5–8 show which transistors are turned on (indicated by a "1" next to their gate input) and off ("0") as motor 100 commutates from coils 25–26 to coils 25–27. Note that only one of the upper transistors 21 is on, while lower transistors 30 and 34 are on at various times depending on the value of the PWM signal and the duty cycle ramp. In FIG. 5, transistors 21 and 30 are turned on and current flows though them and through coils 25 and 26. Even before the duty cycle ramp begins, the PWM signal applied to transistor 30 switches on and off. FIG. 6 shows (in broken lines) where the current flows when PWM=0 through the "flyback" diode 31 (due to an effect called "inductive kick"), but still from transistor 21 to coils 25 and 26.

Current builds up and decays in the coils at a much slower rate than the PWM switching action. In FIG. 5, the current in both coils 25 and 26 is increasing while in FIG. 6 it is decaying. By allowing more time (greater duty cycle) for current to build up than for it to decay, the average current level increases. Conversely, if the duty cycle is decreased, the average current level drops because it has more time to decay than it has to increase.

Figure 7:
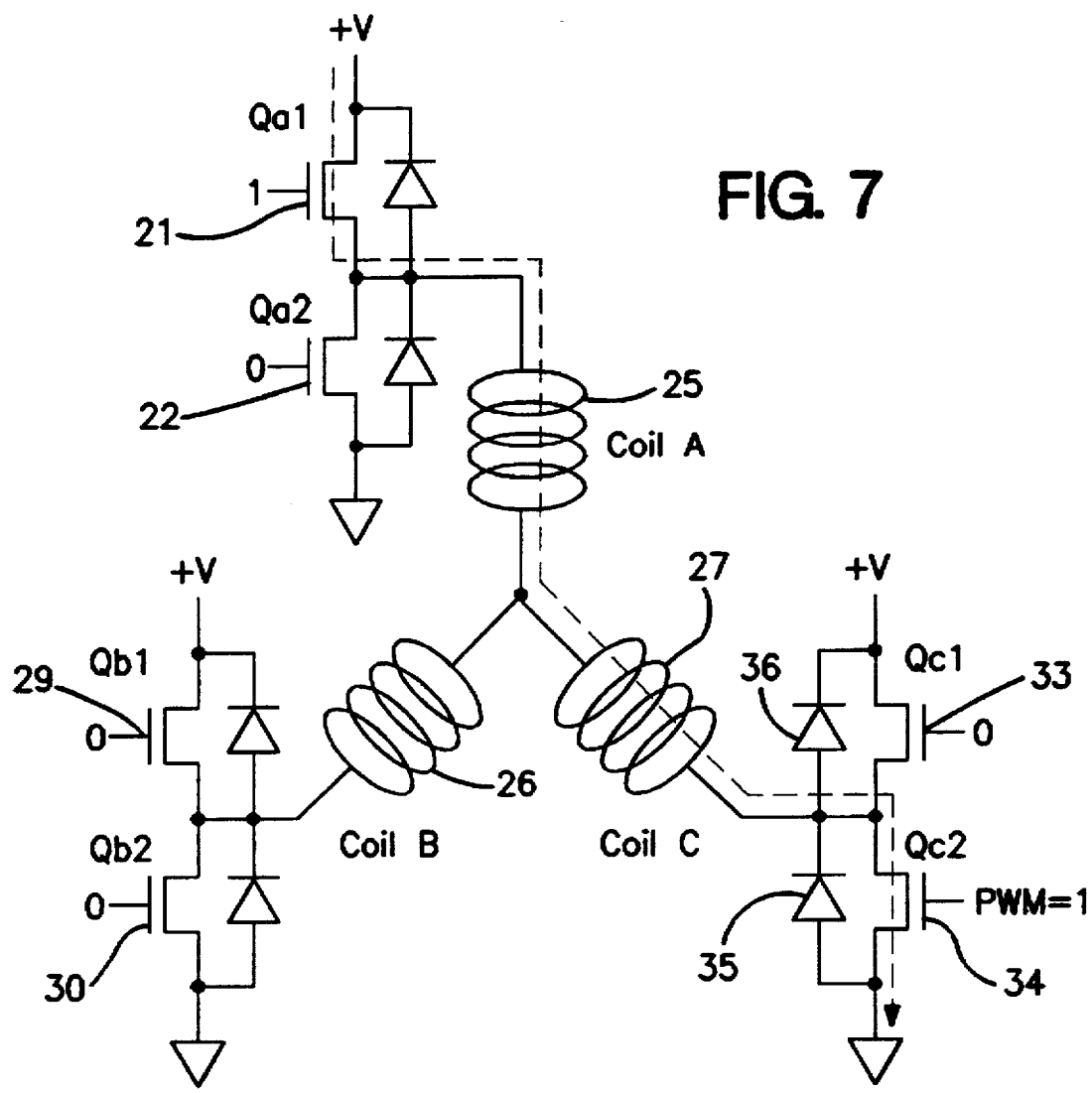
Figure 8:
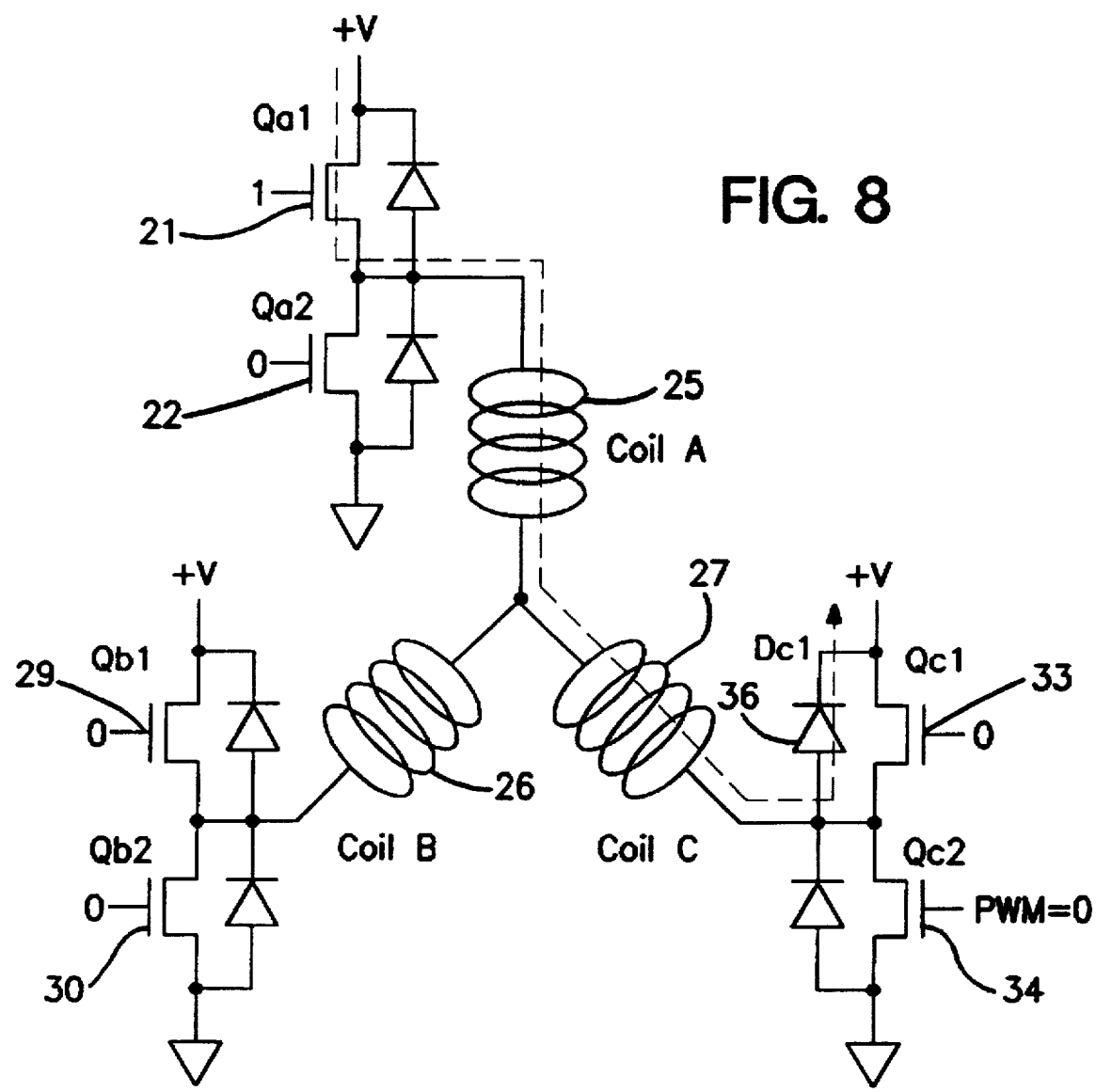

FIGS. 7 and 8 show the same sequence of events for current flow in coils 25 and 27, which corresponds to the next commutation state. The lower transistor 34 is switched on and off and the current flows alternately in transistor 34 and diode 36, but always in upper transistor 21 and coils 25 and 27. The other four transistors (i.e., transistors 22, 29, 30, and 33) are all off.

FIGS. 5–8 thus correspond to what happens when the "Average PWM duty cycle" of FIG. 5 has reached its maximum. It is this average PWM duty cycle that is the gate drive PWM signal applied on line 13. During the ramp, motor 100 and its power transistors are switched between commutation states to achieve an overlap in the current flow.

As the ramp begins (see FIG. 5), commutation step 1 directs the gate drive (average) PWM signal exclusively to transistor 30. The gate drive to transistor 30 (on line 13$_{30}$) switches between 0 and 1 and the current flows alternately in transistor 30 and flyback diode 31. Then the gate drive (average) PWM signal begins to be reduced to transistor 30 by occasionally applying zero (on line 13$_{30}$ via signal source select switch 12) instead of the nominal PWM signal. At the same time, controller 110 occasionally applies the nominal PWM signal to transistor 30.

Thus, in the noise reduction mode of operation, there are three duty cycles to consider: the duty cycle of the nominal or processor PWM applied on line 10 (which is fixed in the illustrated embodiment); the duty cycle of the synthesized Hall signal applied on line 4 from state machine 20 to machine 8; and, the duty cycle of the resulting gate drive PWM or "average" duty cycle applied on line 13.

During the overlap (shown for example in FIG. 4), both coils 26 and 27 conduct current at the same time as if commutation steps 1 and 2 were mixed together. Since coil 25 remains on, all three coils 25, 26, and 27 conduct simultaneously for a period of time. At the end of the ramp the gate drive PWM signal is being applied exclusively to transistor 34 while transistor 30 if turned off.

Figure 9:
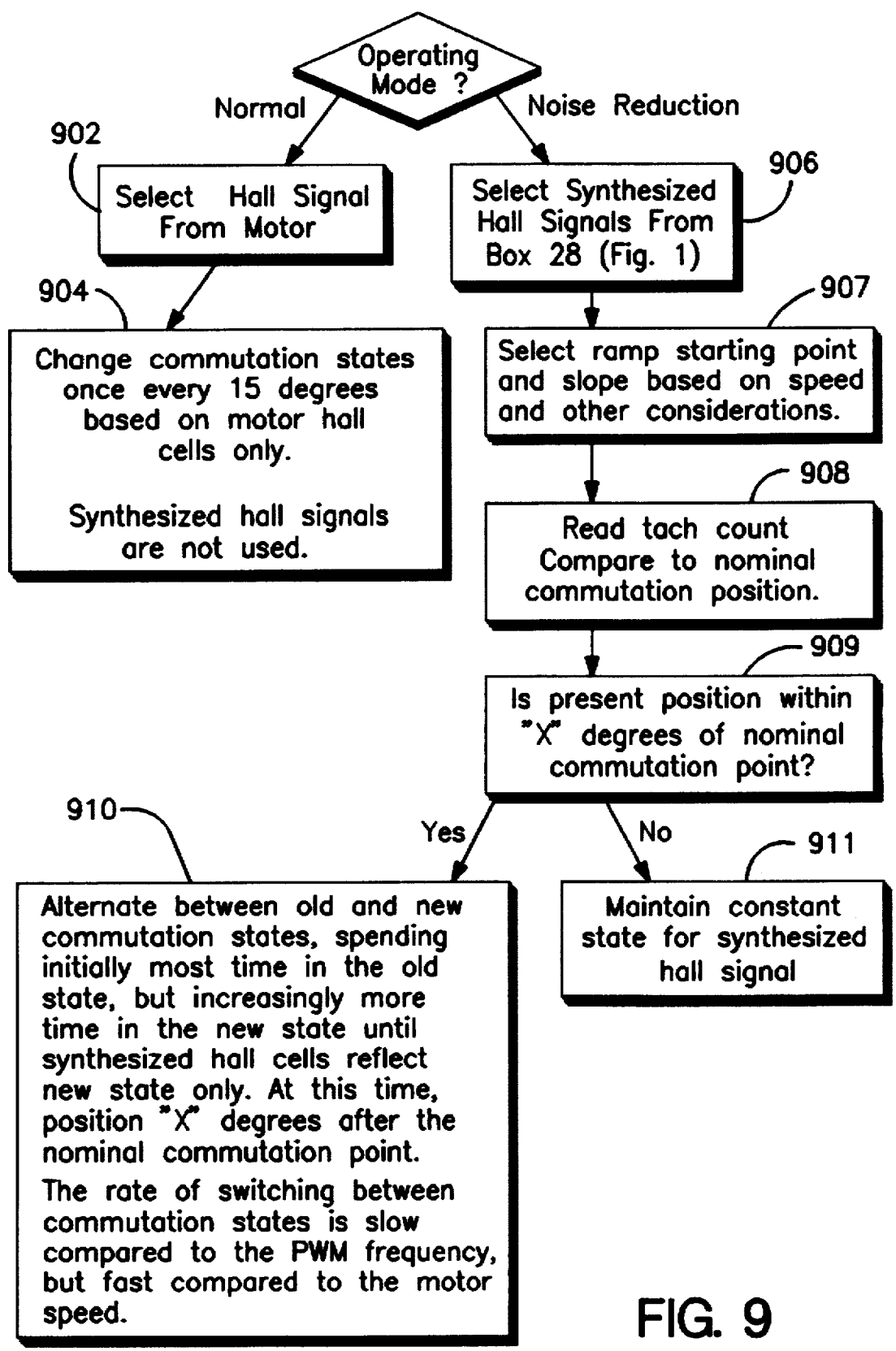
FIG. 9 shows a flowchart illustrating steps executed by the motor control system of the invention.

FIG. 9 shows a flow diagram useful for summarizing operation of motor control system 110. At step 900, processor 1 determines whether it has been programmed to be in the normal mode or the noise reduction mode. If the normal mode has been selected, steps 902 and 904 are executed. If the noise reduction mode has been selected, steps 906–911 are executed.

In the normal mode, at step 902 processor 1 applies its mode select signal on line 2 to mode select switch 6 so that actual Hall signals from Hall sensors 28 (from line 5) are applied on line 7 to the six circuits comprising machine 8. The changing of state of the actual Hall signals every 15 degrees of rotation of rotor 102 accordingly causes each table 11 to change its commutation state every 15 degrees in the manner illustrated in FIG. 3. In the normal mode of operation, the synthesized Hall signals generated by state machine 20 are not utilized.

In the noise reduction mode, at step 906 processor 1 applies a signal on mode select line 2 so that mode select switch 6 transmits the synthesized Hall state signal on line 4 for use as the signal to be applied on line 4 to the six circuits in machine 8. The synthesized Hall state signal on line 4 can alternate between two digital values, a first of the digital values being known as the "old" state and a second of the digital values being known as the "new" state. As indicated below, the Hall equivalent translator 19 controls switching of the value on line 4 between the old and new states.

As indicated by step 907, state machine 20, particularly Hall equivalent translator 19, has been programmed or downloaded (e.g., on line 3 from processor 1) with various synthesizing input parameters. These synthesizing input parameters include a ramp starting point input parameter, a ramp slope input parameter, and a ramp termination input parameter. In accordance with other operating considerations such as motor speed, and in the manner described below, Hall equivalent translator 19 uses the synthesizing input parameters to determine a ramp starting differential, a ramp termination differential, and timing of state changes of the synthesized Hall signal applied on line 4 in order to affect the desired ramping technique as shown in FIG. 4. The ramp starting point and ramp termination point are in terms of angular position of rotor 102, and the differentials are in terms of degrees (e.g., both differentials being shown as the same "X" degrees in the particular embodiment shown in FIG. 4 and FIG. 9). FIG. 4 shows how the ramp starting differential and the ramp termination differential are utilized to ascertain an exemplary ramp starting point RSP and ramp termination point RTP.

Step 908 reflects monitoring by state machine 20 of the tach signal on line 16 from tachometer 15. Decoder 17 constantly decodes the tach signal on line 16, so that position counter 18 can determine at any moment the rotational position of rotor 102. Step 908 shows the tach count being read, and comparison of the thusly known rotational position of rotor 102 with the commutation points. Then, as indicated at step 909, Hall equivalent translator 19 determines if the current rotational position of the rotor 102 is within the ramp starting differential of the commutation point (i.e., if the ramp starting point RSP has been reached). If the ramp starting point has been reached, step 910 is executed. Otherwise, as indicated by step 911, the value of the synthesized Hall signal on line 3 is maintained at a constant, since no ramping is then to occur and only one set of transistors is energized (i.e., current flows in two of the three coils).

At step 910, Hall equivalent translator 9 causes the signal on line 4 to alternate between its "old" and "new" states. Upon reaching a ramp starting point RSP, the signal on line 4 initially spends most of its time in the old state, but increasingly more time is spent in the new state (as indicated by the ramping up in FIG. 4) until the signal reflects only the new state. The signal on line 4 will not be steady with the new state until "X" degrees after the commutation point.

It should be understood that while the synthesized signal on line 4 is being interpreted by machine 8 to ramp up one transistor (e.g., interpreted by transistor control circuit 8$_{34}$ to ramp up transistor Qc2=transistor 34 in FIG. 4), the same signal is being interpreted by machine 8 to ramp down another transistor (e.g., interpreted by transistor control circuit 8$_{30}$ to ramp down transistor Qb2=transistor 30 in FIG. 4).

Similarly understood from FIG. 9, a similar positional monitoring technique is utilized so that Hall equivalent translator 19 knows when to start ramping down, e.g., to start spending increasingly more time in the old state than the new state.

Thus, restated differently, in the noise reduction mode, state machine 20 constantly monitors the position of motor 100 as indicated by the tachometer signal 16. This position is compared to the known commutation points and a programmable value "X" which represents the starting point of the ramp, located some number of degrees before the nominal commutation points. A second programmable value represents the slope of the ramp. A third programmable value can be used to adjust the phase of the ramp, relative to motor angular position.

If the motor position is more than "X" degrees from the nominal commutation point, say between 3 and 12 degrees position (with the nominal commutation points at 15, 30, 45 ... degrees), the synthesized hall signal on line 4 and the nominal hall signals are the same. The six outputs of machine 8 likewise are static (except in the sense that the gate drive PWM signal is switching between 0 and 1, but it is applied to the same one or two transitors during this time).

At 12 degrees of position, a commutation state ramp begins: the value of the signal on line 4 is switched between the old state (used exclusively between 3 and 12 degrees) and the new state (which will be the exclusive state between positions 18 to 27 degrees). At first, the mix is mostly old with a little new, but as motor 100 rotates further, the mix is changed to include more of the new state and less of the old until, at position 18 degrees, the mix is 100% new state. The rate at which machine 20 switches between these two states is slower than the PWM frequency, but much faster than the time between nominal commutation points.

For maximum flexibilty, the input parameters are programmable, e.g., the starting position of the ramp, the slope, and perhaps the phase (so the ramp might start and end early or late).

It will be understood by the man skilled in the art, in connection with conventional commutation table construction, how to prepare commutation tables 11 of machine 8 in order to implement the invention as described herein.

Figure 10:
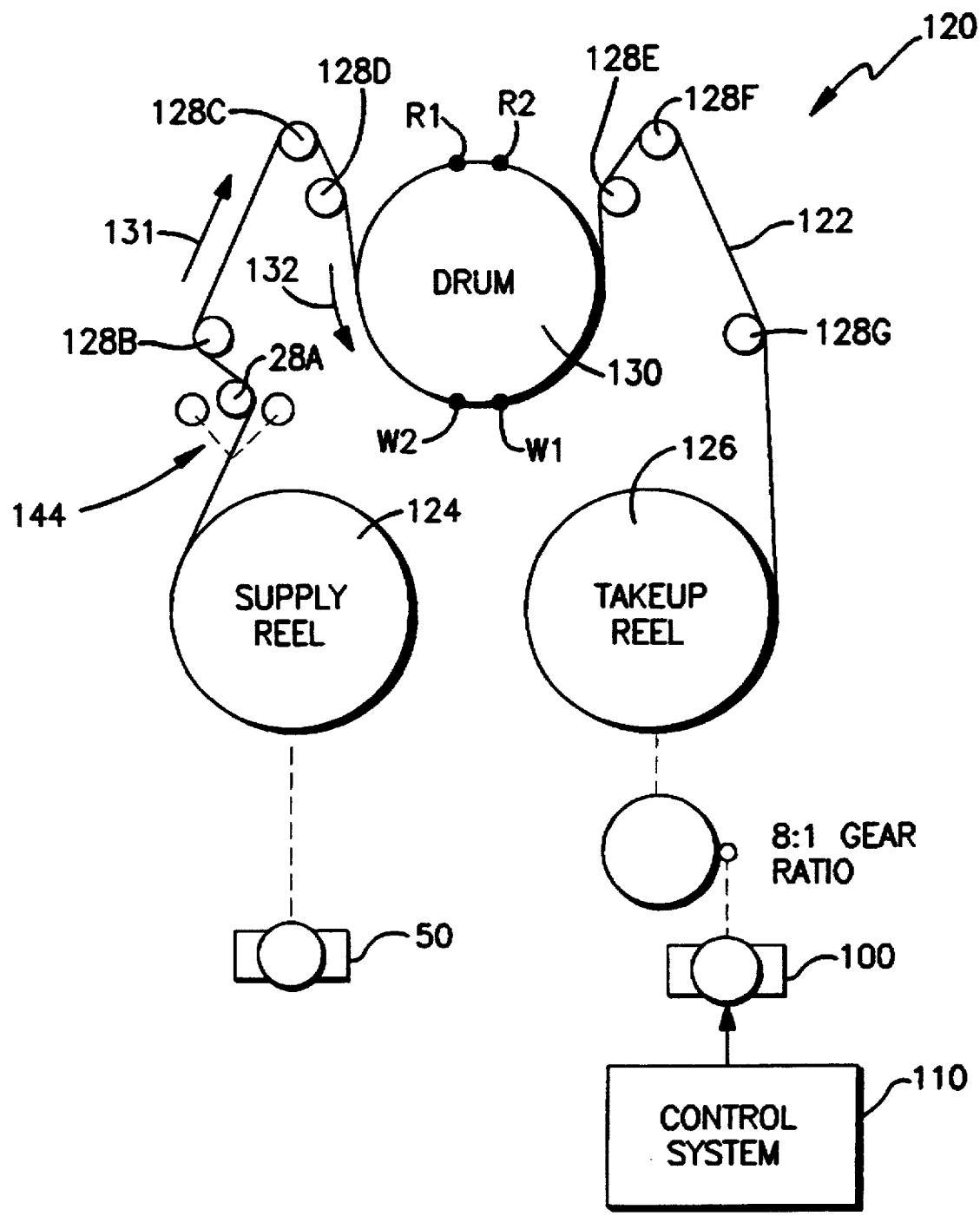
FIG. 10 is a schematic view illustrating usage of the motor control system of the invention in a helical scan tape drive.

In one embodiment, illustrated in FIG. 10, motor control system 110 as described herein as application in a helical scan magnetic tape drive 120, particularly for controlling operation of reel motors such as a take up reel 126. FIG. 10 shows a capstanless a helical scan recording system or drive. FIG. 10 illustrates generally with reference numeral 120 a tape path. In particular, FIG. 10 shows a magnetic tape 122 (such as an 8 mm magnetic tape, for example) having a first end wound around a supply reel 124 and a second end wound around a take-up reel 126. The path traversed by tape 122 is defined at least in part by a series of tape guides 128A–128G and a rotating scanner or drum 130. Tape guides 128 and drum 130 are ultimately mounted on a deck floor. In all operations excepting a rewind operation, tape 122 travels from supply reel 124 to take-up reel 126 in the direction depicted by arrow 131.

As shown in FIG. 10, drum 130 has read heads R1 and R2 as well as write heads W1 and W2 mounted on the circumference thereof. Drum 130 rotates in the direction depicted by arrow 132. In addition, drum 130 has a servo head S mounted circumferentially thereon. As drum 130 rotates, at any moment a portion of its circumference is in contact with travelling tape. During a recording or write operation, write heads W1 and W2 are periodically positioned to record "stripes" or "tracks" as heads W1 and W2 move in a direction of head travel across tape 122. FIG. 10 also shows a tensioning arm 144.

Details regarding the positioning of the heads W1, W2, R1, R2 and S, as well as the particular track recording scheme achieved by drum 130, are disclosed in United States Patent Application Ser. No. 08/150,726 (filed Nov. 12, 1993) of Georgis and Zweighaft entitled "Method And Apparatus For Controlling Media Linear Speed In A Helical Scan Recorder" (incorporated herein by reference).

Take-up reel 126 includes a geared take-up motor 100. The motor control system 10 of the present invention is utilized, in the embodiment of FIG. 10, to control take-up reel motor 100 in the manner aforedescribed.

Application of motor control system 110 to a helical scan magnetic tape drive can be understood in further detail by reference, for example, to U.S. patent application Ser. No. 08/150,730 entitled CAPSTANLESS HELICAL DRIVE SYSTEM; U.S. patent application Ser. No. 08/150,731 entitled HIGH PERFORMANCE POWER AMPLIFIER; and U.S. patent application Ser. No. 08/150,727 entitled POWER-OFF MOTOR DECELERATION CONTROL SYSTEM, all of which are incorporated herein by reference. In such embodiment, the ramp starting point RSP and ramp termination point RTP as shown in FIG. 4 may be equidistant between commutation points (e.g., 7 degrees before and after a commutation point, respectively).

Advantageously, motor control circuit 110 of the present invention digitally emulates the effect of a snubber. According to the invention, the gate drive duty cycle of the applied voltage is ramped down with respect to a nominal gate drive value to some chosen minimum value corresponding to one of the commutation points. As the commutation point is passed, the gate drive duty cycle is ramped back up to the nominal gate drive value and held there until the next commutation point approaches. This process is repeated at every commutation point. Because the motor current is controlled by the gate drive duty cycle, it will be minimized at the commutation points where one set of coils are energized while a second set are de-energized. This greatly reduces the abruptness of the coil changeover that is the primary cause of acoustic noise, resulting in nearly silent operation.

It is thus possible to overlap the rise and fall of current in some subset of the coils as the motor passes through a commutation point. In this case the coil changeover does not occur all at once at some angular position, but rather occurs gradually over some finite distance. This technique results in improved noise reduction.

While the invention has been particularly shown and described with reference to the preferred embodiments thereof, it will be understood by those skilled in the art that various alterations in form and detail may be made therein without departing from the spirit and scope of the invention. For example, it should be understood that the nominal PWM signal applied on line 10 can be generated by means other than a processor, as is conventionally known. Moreover, rather than having an essentially constant processor or nominal PWM value applied on line 10, the PWM value on line 10 can be varied in accordance with desired average torque in the motor. Further, while the embodiment described herein corresponds to a "2 quadrant" switching scheme, it should be understood that the invention applies equally well to other schemes, such as "4 quadrant" switching.

The embodiments of the invention in which an exclusive property or privilege is claimed are defined as follows:

1. A method for controlling a brushless DC motor, the motor having a plurality of coils and a switching amplifier coil driving circuit including a first transistor and a second transistor, the method comprising:

generating a pulse width modulation (PWM) signal;

using the PWM signal to generate a first gate drive PWM signal for selective application to a gate of the first transistor, the first gate drive PWM signal having a decreasing duty cycle in advance of a commutation point of the motor;

using the PWM signal to generate a second gate drive PWM signal for selective application to a gate of the second transistor, the second gate drive PWM signal having an increasing duty cycle in advance of the commutation point of the motor;

thereby obtaining a simultaneous rise in current applied to a first coil of the motor and a fall in current applied to a second coil of the motor.

2. The method of claim 1, wherein one of (1) increasing the duty cycle of the first gate drive PWM signal and (2) decreasing the duty cycle of the second gate drive PWM signal includes selectively switching between the PWM signal and a constant signal.

3. The method of claim 2, wherein the selective switching is in response to a synthesized state signal, the synthesized state signal being generated to alternate between two states.

4. The method of claim 3, wherein the selective switching is in response to the synthesized state signal, the synthesized state signal being generated to alternate variably between the two states in accordance with a desired ramping of current to the first transistor and the second transistor.

5. The method of claim 4, wherein the synthesized state signal begins to alternate between the two states at a ramp start pointing point which occurs at a rotational offset from the commutation point.

6. The method of claim 5, wherein the ramp starting point is programmable.

7. The method of claim 4, wherein durations of the synthesized state signal in each of its states is dependent upon position of a rotor of the motor relative to its commutation points.

8. The method of claim 1, wherein the motor is used to rotate a reel of a helical scan tape drive.

9. A control system for a brushless DC motor, the motor having a plurality of coils and a switching amplifier coil driving circuit including a first transistor and a second transistor, the control system comprising:

a first transistor control circuit which selectively applies a first gate drive PWM signal to a gate of the first transistor, a duty cycle of the first gate drive PWM signal having a first modulation in advance of a commutation point of the motor;

a second transistor control circuit which selectively applies a second gate drive PWM signal to a gate of the second transistor, a duty cycle of the second gate drive PWM signal having a second modulation in advance of a commutation point of the motor;

a state signal generator which generates a state signal, the state signal being applied to the first transistor control circuit to control the first modulation and to the second transistor control circuit to control the second modulation, thereby the first modulation and the second modulation obtaining at the commutation point of the motor, a simultaneous rise in current applied to a first coil of the motor and a fall in current applied to a second coil of the motor.

10. The system of claim 9, wherein the state signal generator generates the state signal to alternate between two states.

11. The system of claim 10, wherein the state signal generator generates the state signal to alternate variably between the two states in accordance with the first modulation and the second modulation.

12. The system of claim 10, wherein the state signal generator generates the state signal to begin to alternate between the two states at a ramp start pointing point which occurs at a rotational offset from the commutation point.

13. The method of claim 12, wherein the ramp starting point is programmable.

14. The system of claim 10, wherein the state signal generator generates the state signal whereby durations of the state signal in each of its states is dependent upon position of a rotor of the motor relative to the commutation points.

15. A brushless DC motor comprising:

a plurality of motor coils;

a switching amplifier coil driving circuit including a first transistor and a second transistor;

a motor control circuit, the motor control system comprising:

a first transistor control circuit which selectively applies a first gate drive PWM signal to a gate of the first transistor, a duty cycle of the first gate drive PWM signal having a first modulation in advance of a commutation point of the motor;

a second transistor control circuit which selectively applies a second gate drive PWM signal to a gate of the second transistor, a duty cycle of the second gate drive PWM signal having a second modulation in advance of a commutation point of the motor;

a state signal generator which generates a state signal, the state signal being applied to the first transistor control circuit to control the first modulation and to the second transistor control circuit to control the second modulation, thereby by the first modulation and the second modulation obtaining at the commutation point of the motor, a simultaneous rise in current applied to a first coil of the motor and a fall in current applied to a second coil of the motor.

16. The system of claim 15, wherein the state signal generator generates the state signal being to alternate between two states.

17. The system of claim 16, wherein the state signal generator generates the state signal to alternate variably between the two states in accordance with the first modulation and the second modulation.

18. The system of claim 16, wherein the state signal generator generates the state signal to begin to alternate between the two states at a ramp start pointing point which occurs at a rotational offset from the commutation point.

19. The method of claim 18, wherein the ramp starting point is programmable.

20. The system of claim 16, wherein the state signal generator generates the state signal whereby durations of the state signal in each of its states is dependent upon position of a rotor of the motor relative to the commutation points.

21. A helical scan magnetic tape drive system comprising:

a drum upon which a plurality of heads are mounted;

a tape supply reel;

a supply reel motor for rotating the tape supply reel;

a tape take-up reel;

a take-up reel motor for rotating the tape take-up reel;

a tape path extending between the supply reel and the take-up reel and at least partially around the drum;

wherein at least one of the supply reel motor and the take-up reel motor is a brushless DC motor having a plurality of coils and a switching amplifier coil driving circuit including first transistor and a second transistor;

a motor control system for controlling at least one of the supply reel motor and the take-up reel motor, the motor control system comprising:

a first transistor control circuit which selectively applies a first gate drive PWM signal to a gate of the first transistor, a duty cycle of the first gate drive PWM signal having a first modulation in advance of a commutation point of the motor;

a second transistor control circuit which selectively applies a second gate drive PWM signal to a gate of the second transistor, a duty cycle of the second gate drive PWM signal having a second modulation in advance of a commutation point of the motor;

a state signal generator which generates a state signal, the state signal being applied to the first transistor control circuit to control the first modulation and to the second transistor control circuit to control the second modulation, thereby by the first modulation and the second modulation obtaining at the commutation point of the motor, a simultaneous rise in current applied to a first coil of the motor and a fall in current applied to a second coil of the motor.

22. The system of claim 21, wherein the state signal generator generates the state signal to alternate between two states.

23. The system of claim 22, wherein the state signal generator generates the state signal to alternate variably between the two states in accordance with the first modulation and the second modulation.

24. The system of claim 22, wherein the state signal generator generates the state signal to begin to alternate between the two states at a ramp start pointing point which occurs at a rotational offset from the commutation point.

25. The method of claim 24, wherein the ramp starting point is programmable.

26. The system of claim 22, wherein the state signal generator generates the state signal whereby durations of the state signal in each of its states is dependent upon position of a rotor of the motor relative to the commutation points.

27. A method of controlling a brushless DC motor having a plurality of coils and a switching amplifier coil driving circuit including transistors, the method comprising:

generating a PWM signal;

at a commutation point of the motor, ramping up a duty cycle of a first gate drive signal applied to a first transistor of the driving circuit while simultaneously ramping down a duty cycle of a second gate drive signal applied to a second transistor of the driving circuit, the first gate drive signal and the second gate drive signal being generated by switching between a voltage of the PWM signal and zero voltage in accordance with the respective duty cycle of the first gate driving signal and the second gate driving signal.

28. The method of claim 27, wherein the duty cycle of the first gate drive signal is ramped up by increasing a portion of the a cycle of the first gate drive signal in which the voltage of the PWM signal is applied relative to a portion of the cycle of the first gate drive signal in which zero voltage is applied, and the duty cycle of the second gate drive signal is ramped down by decreasing a portion of a cycle of the second gate drive signal in which the voltage of the PWM signal is applied relative to a portion of the cycle of the second gate drive signal in which zero voltage is applied.

29. Apparatus for controlling a brushless DC motor having a plurality of coils and a switching amplifier coil driving circuit including transistors, the apparatus comprising:

PWM signal generator;

a controller which, at a commutation point of the motor, ramps up a duty cycle of a first gate drive signal applied to a first transistor of the driving circuit while simultaneously ramping down a duty cycle of a second gate drive signal applied to a second transistor of the driving circuit, the first gate drive signal and the second gate drive signal being generated by switching between a voltage of the PWM signal and zero voltage in accordance with the respective duty cycle of the first gate driving signal and the second gate driving signal.

30. The apparatus of claim 29, wherein the controller comprises at least one commutation look-up table and PWM control circuit.

31. The apparatus of claim 30, wherein the controller comprises a plurality of commutation look-up table and PWM control circuits corresponding to a number of transistors in the switching amplifier coil driving circuit.

32. The apparatus of claim 29, wherein the controller comprises:

a signal source select switch connected to the PWM signal generator and to a source of zero voltage; and a look-up table which determines which applied to the signal source select switch a value used by the signal source select switch for determining the duty cycle of one of the first gate driving signal and second gate driving signal.

33. A method for controlling a brushless DC motor, the motor having a plurality of coils and a switching amplifier coil driving circuit including a first transistor and a second transistor, the method comprising:

generating a pulse width modulation (PWM) signal;

using the PWM signal to generate a first gate drive PWM signal for selective application to a gate of the first transistor, the first gate drive PWM signal having a decreasing duty cycle in advance of a commutation point of the motor;

using the PWM signal to generate a second gate drive PWM signal for selective application to a gate of the second transistor, the second gate drive PWM signal having an increasing duty cycle in advance of the commutation point of the motor;

thereby obtaining a controlled rising current ramp in a first coil of the motor and a simultaneous controlled falling ramp of current in a second coil of the motor, occuring in a region substantially centered at the commutation point.

* * * * *